(12) United States Patent
Konda et al.

(10) Patent No.: US 7,669,190 B2
(45) Date of Patent: Feb. 23, 2010

(54) METHOD AND SYSTEM FOR EFFICIENTLY RECORDING PROCESSOR EVENTS IN HOST BUS ADAPTERS

(75) Inventors: Dharma R. Konda, Aliso Viejo, CA (US); James D. Huey, Huntington Beach, CA (US); Frank W. Campbell, Long Beach, CA (US); Tuan A. Doan, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 991 days.

(21) Appl. No.: 10/847,756

(22) Filed: May 18, 2004

(65) Prior Publication Data

US 2005/0273672 A1    Dec. 8, 2005

(51) Int. Cl.
*G06F 9/44*    (2006.01)
*G06F 11/00*    (2006.01)

(52) U.S. Cl. .......................................... 717/128; 714/45
(58) Field of Classification Search ........................ None
See application file for complete search history.

(56) References Cited

U.S. PATENT DOCUMENTS

| | | | |
|---|---|---|---|
| 4,162,375 A | 7/1979 | Schlichte | |
| 4,268,906 A | 5/1981 | Bourke et al. | |
| 4,333,143 A | 6/1982 | Calder | |
| 4,425,640 A | 1/1984 | Philip et al. | |
| 4,449,182 A | 5/1984 | Rubinson et al. | |
| 4,534,018 A | 8/1985 | Eckert et al. | |
| 4,546,468 A | 10/1985 | Christmas et al. | |
| 4,549,263 A | 10/1985 | Calder | |
| 4,569,043 A | 2/1986 | Simmons et al. | |
| 4,725,835 A | 2/1988 | Schreiner et al. | |
| 4,777,595 A | 10/1988 | Strecker et al. | |

(Continued)

FOREIGN PATENT DOCUMENTS

EP    0649098    4/1995

(Continued)

OTHER PUBLICATIONS

"Notice of Allowance from USPTO dated Apr. 9, 2008 for U.S. Appl. No. 11/039,189".

(Continued)

*Primary Examiner*—Tuan Q Dam
*Assistant Examiner*—Isaac T Tecklu
(74) *Attorney, Agent, or Firm*—Klein, O'Neill & Singh, LLP

(57) ABSTRACT

A host bus adapter ("HBA") is provided with a programmable trace logic that can be enabled or disabled by firmware running on the HBA and if enabled can receive trace information from at least one processor, which is stored in a local memory buffer controlled by a local memory interface. A receive and transmit path processor data is traced and stored in the local memory buffer. The trace logic includes an arbitration module that receives trace data from plural sources and the trace data is stored in a first in first out based buffer before being sent to a direct memory access arbiter module and then to an external memory. Trace data as stored in the external memory includes a trace data source identity value, and a time stamp value indicating when data was collected.

22 Claims, 11 Drawing Sheets

U.S. PATENT DOCUMENTS

| | | | |
|---|---|---|---|
| 4,783,730 A | 11/1988 | Fischer et al. | |
| 4,783,739 A | 11/1988 | Calder | |
| 4,803,622 A | 2/1989 | Bain, Jr. et al. | |
| 4,821,034 A | 4/1989 | Anderson et al. | |
| 4,975,883 A | 12/1990 | Baker et al. | |
| 5,129,064 A | 7/1992 | Fogg, Jr. et al. | |
| 5,144,622 A | 9/1992 | Takiyasu et al. | |
| 5,212,795 A | 5/1993 | Hendry | |
| 5,249,279 A | 9/1993 | Schmenk et al. | |
| 5,276,807 A | 1/1994 | Kodama et al. | |
| 5,280,587 A | 1/1994 | Shimodaira et al. | |
| 5,301,151 A | 4/1994 | Wells et al. | |
| 5,321,816 A | 6/1994 | Rogan et al. | |
| 5,347,638 A | 9/1994 | Desai et al. | |
| 5,367,520 A | 11/1994 | Cordell | |
| 5,371,861 A | 12/1994 | Keener et al. | |
| 5,388,237 A | 2/1995 | Sodos | |
| 5,420,798 A | 5/1995 | Lin et al. | |
| 5,448,702 A | 9/1995 | Garcia, Jr. et al. | |
| 5,469,453 A | 11/1995 | Glider et al. | |
| 5,568,614 A | 10/1996 | Mendelson et al. | |
| 5,594,686 A | 1/1997 | Hazen et al. | |
| 5,598,541 A | 1/1997 | Malladi et al. | |
| 5,610,745 A | 3/1997 | Bennett | |
| 5,613,162 A | 3/1997 | Kabenjian | |
| 5,632,016 A | 5/1997 | Hoch et al. | |
| 5,647,057 A | 7/1997 | Roden et al. | |
| 5,664,197 A | 9/1997 | Kardach et al. | |
| 5,671,365 A | 9/1997 | Binford et al. | |
| 5,687,172 A | 11/1997 | Cloonan et al. | |
| 5,729,762 A | 3/1998 | Kardach et al. | |
| 5,740,467 A | 4/1998 | Chmielecki et al. | |
| 5,742,935 A | 4/1998 | Hazen et al. | |
| 5,748,612 A | 5/1998 | Stoevhase et al. | |
| 5,751,965 A | 5/1998 | Mayo et al. | |
| 5,758,187 A | 5/1998 | Young | |
| 5,761,427 A | 6/1998 | Shah et al. | |
| 5,761,533 A | 6/1998 | Aldereguia et al. | |
| 5,818,781 A | 10/1998 | Estakhri et al. | |
| 5,818,842 A | 10/1998 | Burwell et al. | |
| 5,828,856 A | 10/1998 | Bowes et al. | |
| 5,828,903 A | 10/1998 | Sethuram et al. | |
| 5,835,496 A | 11/1998 | Yeung et al. | |
| 5,859,527 A | 1/1999 | Cook | |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | |
| 5,937,169 A | 8/1999 | Connery et al. | |
| 5,960,451 A | 9/1999 | Voigt et al. | |
| 5,968,143 A | 10/1999 | Chisholm et al. | |
| 5,983,292 A | 11/1999 | Nordstrom et al. | |
| 5,987,028 A | 11/1999 | Yang et al. | |
| 5,999,528 A | 12/1999 | Chow et al. | |
| 6,006,340 A | 12/1999 | O'Connell | |
| 6,014,383 A | 1/2000 | McCarty | |
| 6,021,128 A | 2/2000 | Hosoya et al. | |
| 6,047,323 A | 4/2000 | Krause | |
| 6,049,802 A | 4/2000 | Waggener, Jr. et al. | |
| 6,055,603 A | 4/2000 | Ofer et al. | |
| 6,078,970 A | 6/2000 | Nordstrom | |
| 6,081,512 A | 6/2000 | Muller et al. | |
| 6,085,277 A | 7/2000 | Nordstrom et al. | |
| 6,105,122 A | 8/2000 | Muller et al. | |
| 6,115,761 A | 9/2000 | Daniel et al. | |
| 6,118,776 A | 9/2000 | Berman | |
| 6,119,254 A * | 9/2000 | Assouad et al. | 714/724 |
| 6,128,292 A | 10/2000 | Kim et al. | |
| 6,134,617 A | 10/2000 | Weber | |
| 6,138,176 A | 10/2000 | McDonald et al. | |
| 6,144,668 A | 11/2000 | Bass et al. | |
| 6,145,123 A * | 11/2000 | Torrey et al. | 717/128 |
| 6,160,813 A | 12/2000 | Banks et al. | |
| 6,167,465 A | 12/2000 | Parvin et al. | |
| 6,185,620 B1 | 2/2001 | Weber et al. | |
| 6,233,244 B1 | 5/2001 | Runaldue et al. | |
| 6,246,683 B1 | 6/2001 | Connery et al. | |
| 6,247,060 B1 | 6/2001 | Boucher et al. | |
| 6,269,410 B1 * | 7/2001 | Spasojevic | 710/5 |
| 6,269,413 B1 | 7/2001 | Sherlock | |
| 6,308,220 B1 | 10/2001 | Mathur | |
| 6,324,181 B1 | 11/2001 | Wong et al. | |
| 6,330,236 B1 | 12/2001 | Ofek et al. | |
| 6,334,153 B2 | 12/2001 | Boucher et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,389,479 B1 | 5/2002 | Boucher et al. | |
| 6,393,487 B2 | 5/2002 | Boucher et al. | |
| 6,397,277 B1 | 5/2002 | Kato et al. | |
| 6,408,349 B1 | 6/2002 | Castellano | |
| 6,411,599 B1 | 6/2002 | Blanc et al. | |
| 6,424,658 B1 | 7/2002 | Mathur | |
| 6,425,021 B1 | 7/2002 | Ghodrat et al. | |
| 6,425,034 B1 | 7/2002 | Steinmetz et al. | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,434,630 B1 | 8/2002 | Micalizzi, Jr. et al. | |
| 6,449,274 B1 | 9/2002 | Holden et al. | |
| 6,457,090 B1 | 9/2002 | Young | |
| 6,463,032 B1 | 10/2002 | Lau et al. | |
| 6,467,008 B1 | 10/2002 | Gentry et al. | |
| 6,470,173 B1 | 10/2002 | Okada et al. | |
| 6,470,415 B1 | 10/2002 | Starr et al. | |
| 6,502,189 B1 | 12/2002 | Westby | |
| 6,504,846 B1 | 1/2003 | Yu et al. | |
| 6,526,518 B1 | 2/2003 | Catlin et al. | |
| 6,535,945 B1 | 3/2003 | Tobin et al. | |
| 6,538,669 B1 | 3/2003 | Lagueux, Jr. et al. | |
| 6,546,010 B1 | 4/2003 | Merchant et al. | |
| 6,552,934 B2 | 4/2003 | Roohparvar | |
| 6,564,271 B2 | 5/2003 | Micalizzi et al. | |
| 6,591,302 B2 | 7/2003 | Boucher et al. | |
| 6,594,329 B1 | 7/2003 | Susnow | |
| 6,597,691 B1 | 7/2003 | Anderson et al. | |
| 6,597,777 B1 | 7/2003 | Ho | |
| 6,604,224 B1 | 8/2003 | Armstrong et al. | |
| 6,636,909 B1 | 10/2003 | Kahn et al. | |
| 6,643,748 B1 | 11/2003 | Wieland | |
| 6,671,776 B1 | 12/2003 | DeKoning | |
| 6,671,832 B1 | 12/2003 | Apisdorf | |
| 6,697,359 B1 | 2/2004 | George | |
| 6,721,799 B1 | 4/2004 | Slivkoff | |
| 6,725,388 B1 | 4/2004 | Susnow | |
| 6,728,949 B1 * | 4/2004 | Bryant et al. | 717/127 |
| 6,732,307 B1 * | 5/2004 | Edwards | 714/724 |
| 6,760,302 B1 | 7/2004 | Ellinas et al. | |
| 6,763,398 B2 | 7/2004 | Brant et al. | |
| 6,775,693 B1 | 8/2004 | Adams | |
| 6,810,440 B2 | 10/2004 | Micalizzi, Jr. et al. | |
| 6,810,442 B1 | 10/2004 | Lin | |
| 6,839,747 B1 | 1/2005 | Blumenau et al. | |
| 6,871,248 B2 | 3/2005 | Riley | |
| 6,886,141 B1 | 4/2005 | Kunz et al. | |
| 6,944,829 B2 | 9/2005 | Dando | |
| 7,000,025 B1 | 2/2006 | Wilson | |
| 7,051,182 B2 | 5/2006 | Blumenau et al. | |
| 7,055,014 B1 | 5/2006 | Pawlowski et al. | |
| 7,080,289 B2 * | 7/2006 | Swaine et al. | 714/45 |
| 7,089,357 B1 * | 8/2006 | Ezra | 711/113 |
| 7,093,236 B2 * | 8/2006 | Swaine et al. | 717/128 |
| 7,117,141 B2 | 10/2006 | Kaji et al. | |

| | | |
|---|---|---|
| 7,117,304 B2 | 10/2006 | Sohn |
| 7,155,553 B2 | 12/2006 | Lueck et al. |
| 7,155,641 B2 * | 12/2006 | Prang et al. .................. 714/47 |
| 7,171,624 B2 | 1/2007 | Baldwin et al. |
| 7,230,549 B1 | 6/2007 | Woodral et al. |
| 7,231,480 B2 | 6/2007 | Woodral |
| 7,231,560 B2 | 6/2007 | Lai et al. |
| 7,254,206 B2 | 8/2007 | Chiang |
| 7,302,616 B2 * | 11/2007 | Dodson et al. ............... 714/45 |
| 2001/0038628 A1 | 11/2001 | Ofek et al. |
| 2002/0010882 A1 * | 1/2002 | Yamashita ................ 714/45 |
| 2002/0034178 A1 | 3/2002 | Schmidt et al. |
| 2002/0069317 A1 | 6/2002 | Chow et al. |
| 2002/0073090 A1 * | 6/2002 | Kedem et al. ............... 707/10 |
| 2002/0131419 A1 | 9/2002 | Tamai |
| 2002/0147802 A1 | 10/2002 | Murotani et al. |
| 2002/0196773 A1 | 12/2002 | Berman |
| 2003/0016683 A1 | 1/2003 | George et al. |
| 2003/0056000 A1 | 3/2003 | Mullendore et al. |
| 2003/0056032 A1 | 3/2003 | Micalizzi, Jr. et al. |
| 2003/0061550 A1 * | 3/2003 | Ng et al. ..................... 714/45 |
| 2003/0091062 A1 | 5/2003 | Lay et al. |
| 2003/0097481 A1 | 5/2003 | Richter |
| 2003/0120983 A1 | 6/2003 | Vieregge et al. |
| 2003/0126320 A1 | 7/2003 | Liu et al. |
| 2003/0126322 A1 * | 7/2003 | Micalizzi et al. ............ 710/52 |
| 2003/0154028 A1 * | 8/2003 | Swaine et al. ................ 702/1 |
| 2003/0161429 A1 | 8/2003 | Chiang |
| 2003/0179748 A1 | 9/2003 | George et al. |
| 2003/0189935 A1 | 10/2003 | Warden et al. |
| 2003/0236953 A1 | 12/2003 | Grieff et al. |
| 2004/0028038 A1 | 2/2004 | Anderson et al. |
| 2004/0073862 A1 | 4/2004 | Armstrong et al. |
| 2004/0117690 A1 * | 6/2004 | Andersson .................. 714/45 |
| 2004/0141521 A1 | 7/2004 | George |
| 2004/0221201 A1 * | 11/2004 | Seroff ......................... 714/30 |
| 2004/0267982 A1 | 12/2004 | Jackson et al. |
| 2005/0058148 A1 | 3/2005 | Castellano et al. |
| 2005/0093575 A1 | 5/2005 | Schoenborn et al. |
| 2005/0104623 A1 | 5/2005 | Guo et al. |
| 2005/0141661 A1 | 6/2005 | Renaud et al. |
| 2006/0095607 A1 | 5/2006 | Lim et al. |
| 2006/0123298 A1 | 6/2006 | Tseng |
| 2006/0129733 A1 | 6/2006 | Sobelman |
| 2006/0156083 A1 | 7/2006 | Jang et al. |
| 2006/0209735 A1 | 9/2006 | Evoy |
| 2006/0253757 A1 | 11/2006 | Brink et al. |
| 2007/0011534 A1 | 1/2007 | Boudon et al. |
| 2007/0124623 A1 | 5/2007 | Tseng |
| 2007/0177701 A1 | 8/2007 | Thanigasalam |
| 2007/0262891 A1 | 11/2007 | Woodral et al. |

FOREIGN PATENT DOCUMENTS

| | | |
|---|---|---|
| EP | 0738978 | 10/1996 |
| EP | 0856969 | 8/1998 |
| EP | 1059588 | 12/2000 |
| WO | WO-95/06286 | 3/1995 |
| WO | WO-98/36537 | 8/1998 |
| WO | WO-0058843 | 10/2000 |

OTHER PUBLICATIONS

"Office Action from USPTO dated May 23, 2008 for U.S. Appl. No. 10/948,404".

"Office Action from USPTO dated Jun. 9, 2008 for U.S. Appl. No. 11/099,751".

"Fibre Channel Framing and Signaling (FC-FS) Rev. 1.10", *American National Standards Institute, Inc. (ANSI)*, retrieved from the internet on Nov. 15, 2007 at ftp://ftp.t11.org/t11/pub/fc/fs/01-024v1.pdf,(Jan. 25, 2001),319-320.

"Office Action from the USPTO dated Jan. 4, 2008 for U.S. Appl. No. 11/039,189".

Clark, Tom "Zoning for Fibre Channel Fabrics", *Vixel Corporation Paper—XP002185194*, (Aug. 1999),1-6.

Malavalli, Kumar "Distributed Computing With Fibre Channel Fabric", *Proc. of the Computer Soc. Int'l Conf.*, Los Alamitos, IEEE Comp. Soc. Press., vol. Conf. 37, XP000340745, (Feb. 24, 1992),269-274.

Martin, Charles R., "Fabric Interconnection of Fibre Channel Standard Nodes", *Proceedings of the SPIE*, (Sep. 8, 1992),65-71.

Yoshida, Hu "LUN Security Considerations for Storage Area Networks", *Hitachi Data Systems Pacer—XP 002185193* (1999), 1-4.

Desanti, Claudio "Virtual Fabrics Switch Suppport", *VF Switch Support*, T11/04-395v2, (Sep. 2004),1-15.

Pelissier, "Inter-Fabric Routing", *Inter Fabric Routing* (04-520v0), (Jul. 30, 2004),1-31.

Desanti, "Virtual Fabrics", *Virtual Fabrics*, T11/03 -352v0, (May 2003),1-4.

Martin, "Virtual Channel Architecture", *Presentation by Brocade to*T11/03-369V0, (00/02/2003).

"Fibre Channel Switch Fabric—2(FC-SW-2) Rev 5.4 NCITS Working Draft Proposed American National Standard for Information Technology", T11/Project 1305-D/Rev 5.4, (Jun. 2001).

"Fibre Channel Generic Services—3 (FC-GS-3) Rev. 7.01, NCITS Working Draft Proposed American National Standard for Information Technology,", T11/Project 1356 D/Rev 7.01, (Nov. 28, 2000).

Melhem, et al., "Minimizing Wavelength Conversions in WDM Path Establishment", Computer Science Department, University of Pittsburgh, Pittsburgh, PA 15260, (2001),197-211.

Ridgeway, Curt "OGFC-40GFC using 4-lane XAUI's", *LSI Logic Presentation*—T11/03-069v0.

Curtis, A. R., "Design Considerations for 10-Gbit Fibre Channel", Curtis A. Ridgeway, Distinguished I/O Architect, Storage and Computing ASIC's Division, LSI Logic Corp.

Malavalli, Kumar "High Speed Fibre Channel Switching Fabric Services", Proceedings of the SPIE, *SPIE*, Bellingham, VA, USA vol. 1577,, XP000562869, ISSN: 0277-786X,(Sep. 4, 1991),216-226.

IEEE 100, "The Authoritative Dictionary of IEEE Standards Terms, "nonvolatile random-access memory (NVRAM)"", *Standards Information Network IEEE Press*, Seventh Edition, (Dec. 2000),743.

Xicor, ""Digitally Controlled Potentiometer (XDCP(TM))"", *Xicor*, (Apr. 27, 2001),1-3.

Budruk, Ravi et al., "PCI Express System Architecture", (2004),434,436-439,442-443.

"PCI Express Base Specification Revision 1.0", (Apr. 29, 2002),195-196.

"PCI Express Base Specification Revision 1.0", *PCI-SIG*, (Apr. 29, 2002),183, 184, 199-201.

"PCI Express Base Specification Revision 1.0a", *PCI-SIG*, (Apr. 15, 2003),171, 172, 204 & 205.

Houghton Mifflin Company, "Definition of the term "network", Source: The American Heritage College Dictionary", Fourth Edition,(2002),934.

"Final Office Action from USPTO dated Jan. 27, 2009 for U.S. Appl. No. 11/099,751".

"Office Action from USPTO dated Jul. 21, 2009 for U.S. Appl. No. 11/099,751".

"Final Office Action from USPTO dated Dec. 2, 2008 for U.S. Appl. No. 10/948,404".

* cited by examiner

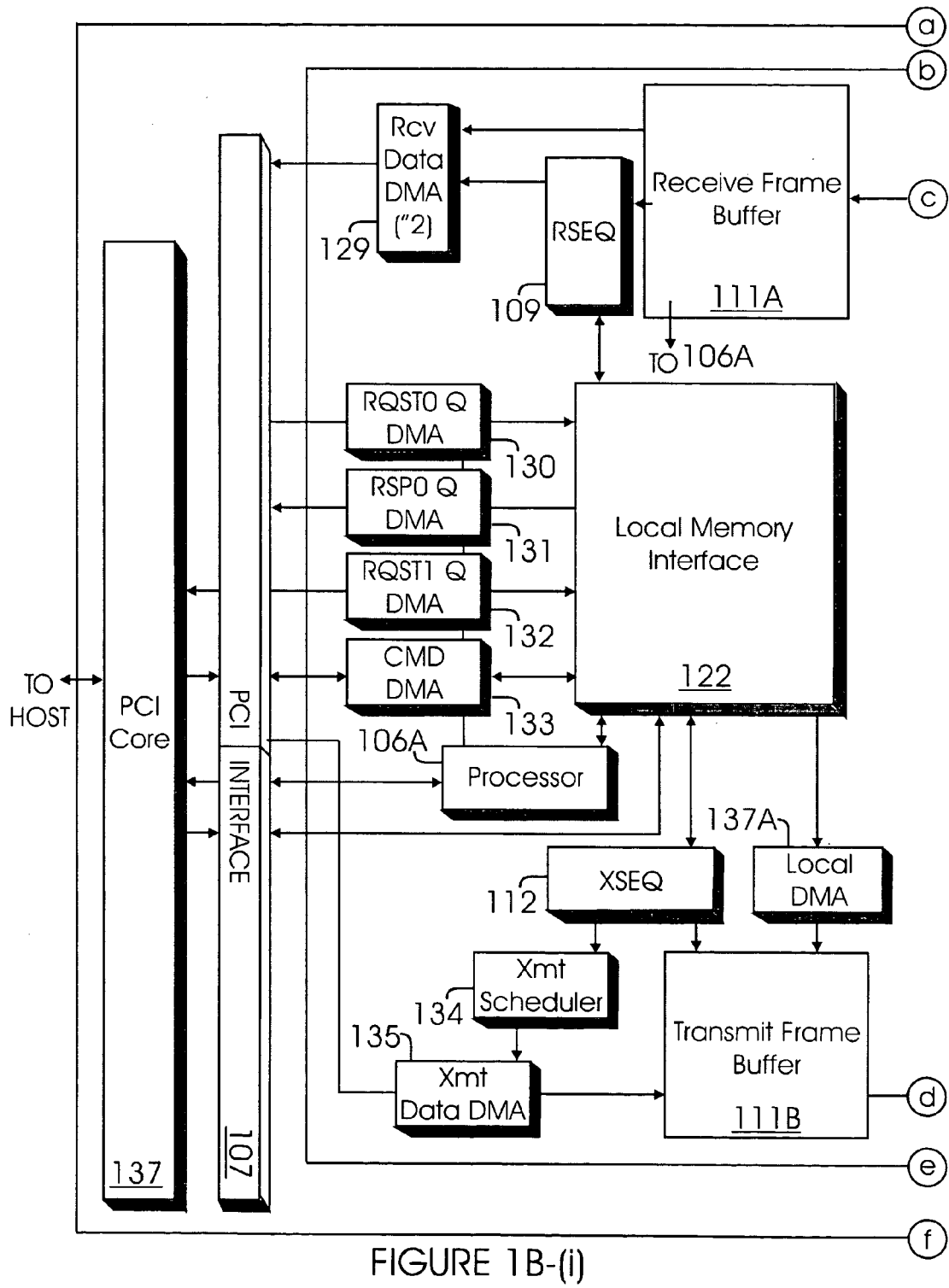
FIGURE 1B-(i)

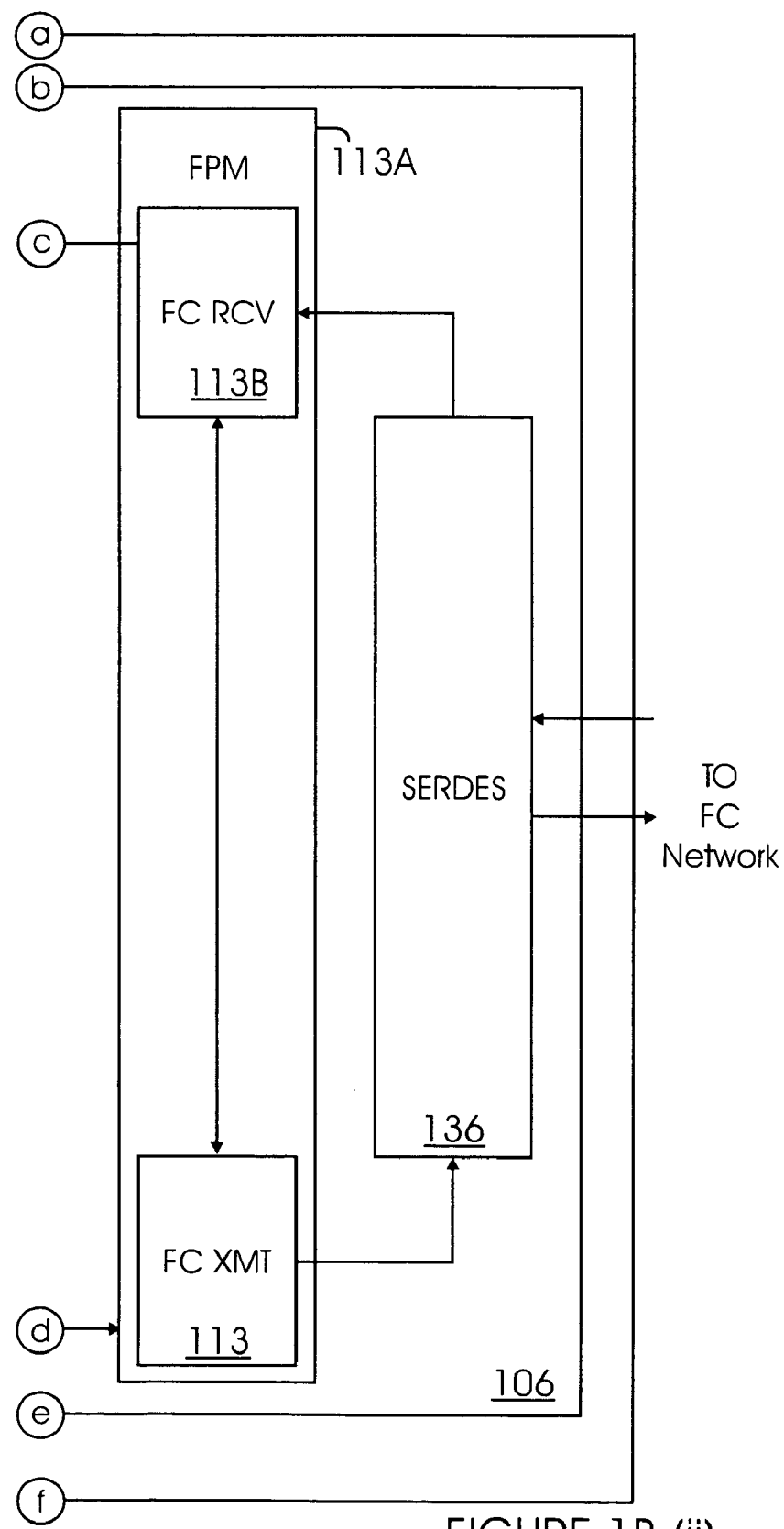
FIGURE 1B-(ii)

| Source Code (bit 29-31) | Source |
|---|---|
| 000 | RISC |
| 001 | XSEQ |
| 010 | RSEQ |
| 011 | REQ0 |
| 100 | REQ1 |
| 101 | RSP0 |
| 110-111 | Reserved |

| | | Firmware Trace Registers (12) | |
|---|---|---|---|
| 0x0000_3050 | R/W | 32 | Circular Buffer 108A Starting Address Register |
| 0x0000_3051 | R/W | 32 | Circular Buffer 108A End Register |
| 0x0000_3052 | R | 32 | Circular Buffer 108A Current Register |
| 0x0000_3053 | R/W | 32 | Circular Buffer 108A Segment Size Register |
| 0x0000_3054 | R | 32 | Segment Register |
| 0x0000_3055 | R/W | 32 | Timer Limit Count Register |
| 0x0000_3056 | W | 32 | RISC 106A Trace Data Register 0 (1 word - Program Counter ("PC") only) |
| 0x0000_3057 | R/W | 32 | RISC 106A Trace Data Register 1 (2 words - PC & Trace Data) |
| 0x0000_30fc | W$^1$ | 32 | XSEQ 112 Trace Data Register 0 (1 word - PC only) |
| 0x0000_30fd | R | 32 | XSEQ 112 Trace Data Register 1 (2 words - PC & Trace Data) |
| 0x0000_31fc | W$^2$ | 32 | RSEQ 109 Trace Data Register 0 (1 word - PC only) |
| 0x0000_31fd | R | 32 | RSEQ 109 Trace Data Register 1 (2 words - PC & Trace Data) |

FIGURE 2

| Bit | Description |
|---|---|
| 13 | RSP0 Trace Enable(0=Disable, 1=Enable) |
| 12 | REQ1 Trace Enable(0=Disable, 1=Enable) |
| 11 | REQ0 Trace Enable(0=Disable, 1=Enable) |
| 10 | RSEQ 109 Trace Enable(0=Disable, 1=Enable) |
| 9 | XSEQ 112 Trace Enable(0=Disable, 1=Enable) |
| 8 | RISC 112A Trace Enable(0=Disable, 1=Enable) |

FIGURE 3

| Bit | Description |
|---|---|
| 31:0 | Memory Start Address of circular buffer 108A |

FIGURE 4

| Bit | Description |
| --- | --- |
| 31:0 | Memory End Address of circular buffer 108A |

FIGURE 5

| Bit | Description |
| --- | --- |
| 31:0 | Memory Current Address of circular buffer 108A |

FIGURE 6

| Bit | Description |
| --- | --- |
| 31:0 | Size of RAM buffer segment |

FIGURE 7

| Bit | Description |
| --- | --- |
| 31:0 | Number of segments being stored in circular buffer 108A |

FIGURE 8

| Bit | Description |
|---|---|
| 31:0 | Number of clocks before incrementing the second stage 9-bit counter |

FIGURE 9

| Bit | Description |
|---|---|
| 31:0 | Dummy Data |

FIGURE 10

| Bit | Description |
|---|---|
| 31:0 | RISC 106A Trace Data for 2-words tracing(Word 1) |

FIGURE 11

| Bit | Description |
|---|---|
| 31:0 | Dummy Data |

FIGURE 12

| Bit | Description |
|---|---|
| 31:0 | XSEQ 112 Trace Data for 2-words tracing (Word 1) |

FIGURE 13

| Bit | Description |
|---|---|
| 31:0 | Dummy Data |

FIGURE 14

| Bit | Description |
|---|---|
| 31:0 | RSEQ 109 Trace Data for 2-words tracing (Word 1) |

FIGURE 15

METHOD AND SYSTEM FOR EFFICIENTLY RECORDING PROCESSOR EVENTS IN HOST BUS ADAPTERS

BACKGROUND

1. Field of the Invention

The present invention relates to storage systems, and more particularly, to maintaining trace information in host bus adapters ("HBAs").

2. Background of the Invention

Storage area networks ("SANs") are commonly used where plural memory storage devices are made available to various host computing systems. Data in a SAN is typically moved from plural host systems (that include computer systems) to the storage system through various controllers/adapters (including HBAs).

Various standard interfaces are used to move data from host systems to storage devices. Fibre channel is one such standard. Fibre channel (incorporated herein by reference in its entirety) is an American National Standard Institute (ANSI) set of standards, which provides a serial provides a serial transmission protocol for storage and network protocols such as HIPPI, SCSI, IP, ATM and others. Fibre channel provides an input/output interface to meet the requirements of both channel and network users.

Host systems often communicate with storage systems via a HBA using the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is a standard bus that is compatible with existing PCI cards using the PCI bus. PCI-X improves the data transfer rate of PCI from 132 MBps to as much as 1 GBps. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

The iSCSI standard (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

The iSCSI architecture is based on a client/server model. Typically, the client is a host system such as a file server that issues a read or write command. The server may be a disk array that responds to the client request.

HBAs today perform complex operations and are key to the overall efficiency of a SAN. HBAs may use more than one processor whose operation should be tracked to perform diagnostics in case of a failure or otherwise. HBA processors use program counters that track various processor-executed operations. However, conventional HBAs do not provide an efficient system for tracing multiple processors or providing the trace information in a user-friendly interface.

Therefore, there is a need for a system and method that can trace multiple processors in an HBA.

SUMMARY OF THE INVENTION

A system for storing trace information is provided. The system includes, a programmable trace logic that can be enabled or disabled by firmware running on a HBA and if enabled can receive trace information from at least one processor, which is stored in a local memory buffer controlled by a local memory interface. A receive and transmit path processor data is traced and stored in the local memory buffer.

In yet another aspect, a host bus adapter ("HBA") is provided with a programmable trace logic that can be enabled or disabled by firmware running on the HBA and if enabled can receive trace information from at least one processor, which is stored in a local memory buffer controlled by a local memory interface.

In yet another aspect of the present invention, a local memory interface for storing processor trace information is provided. The interface includes, a programmable trace logic that can be enabled enabled or disabled by firmware running on a HBA and if enabled can receive trace information from at least one processor, which is stored in a local memory buffer controlled by the local memory interface.

The trace logic includes an arbitration module that receives trace data from plural sources and the trace data is stored in a first in first out based buffer before being sent to a direct memory access arbiter module and then to an external memory. Trace data as stored in a circular memory buffer includes a trace data source identity value, and a time stamp value indicating when data was collected This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following include the following Figures:

FIG. 1B is a block diagram of a host bus adapter that includes trace logic, according to one aspect of the present invention;

FIGS. 2-15 show various registers that are used in various adaptive aspects of the present invention.

DETAILED DESCRIPTION OF THE PREFERRED EMBODIMENTS

To facilitate an understanding of the preferred embodiment, the general architecture and operation of a system using storage devices will be described. The specific architecture and operation of the preferred embodiment will then be described with reference to the general architecture.

It is noteworthy that a host system, as referred to herein, may include a computer, server or other similar devices, which may be coupled to storage systems. Host system includes a host processor, memory, random access memory ("RAM"), and read only memory ("ROM"), and other components.

Figure 1A:
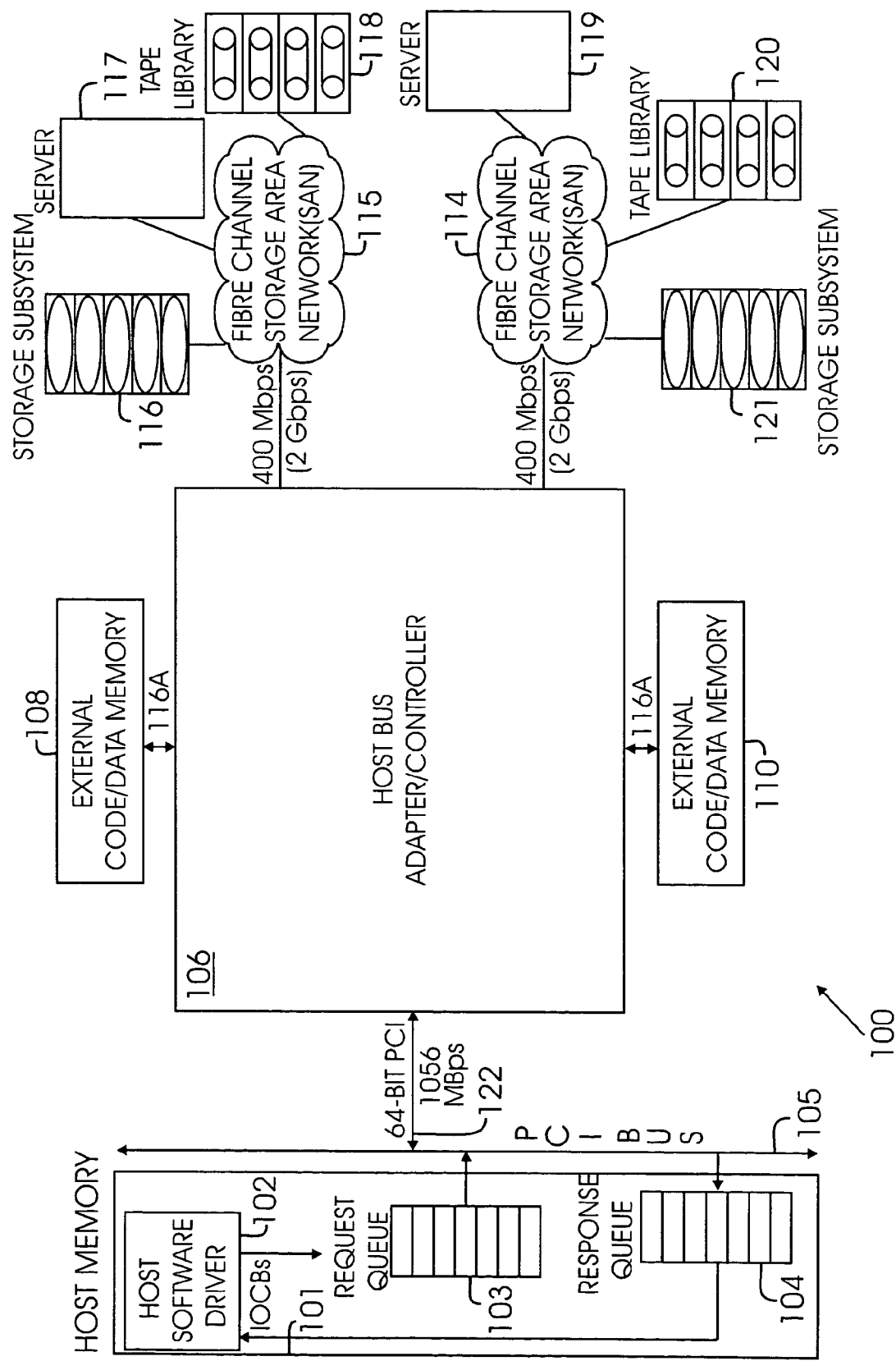
FIG. 1A is a block diagram showing various components of a SAN.

FIG. 1A shows a system 100 that uses a controller/adapter 106 (referred to as "adapter 106) for communication between a host system (not shown) with host memory 101 to various storage systems (for example, storage subsystem 116 and 121, tape library 118 and 120) using fibre channel storage area networks 114 and 115. Host memory 101 includes a driver 102 that co-ordinates all data transfer via adapter 106 using input/output control blocks ("IOCBs").

A request queue 103 and response queue 104 is maintained in host memory 101 for transferring information using adapter 106. Host system communicates with adapter 106 via a PCI bus 105 through a PCI interface 107 (or PCI-X bus and PCI-X bus interface) and PCI core module 137, as shown in FIG. 1B.

FIG. 1B shows a block diagram of adapter 106. Adapter 106 includes processors (may also be referred to as "sequencers") 112 and 109 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106, as described below. It is noteworthy that all the processors (109, 112 and 106A) have program counters for tracking various operations ("trace information").

Adapter 106 also includes fibre channel interface (also referred to as fibre channel protocol manager "FPM") 113A that includes an FPM 113B and 113 in receive and transmit paths, respectively. FPM 113B and 113 allow data 113 allow data to move to/from storage systems 116, 118, 120 and 121.

Adapter 106 is also coupled to external memory 108 and 110 via connection 116A (referred interchangeably, hereinafter) and local memory interface 122. Adapter 106 to store firmware trace results, according to one aspect of the present invention, uses external memory 108.

Memory interface 122 is provided for managing local memory 108 and 110 and includes the trace logic for recording processor events, according to one aspect of the present invention. Local DMA module 137A is used for gaining access to move data from local memory (108/110).

Adapter 106 also includes a serial/de-serializer 136 for converting data from 10-bit to 8-bit format. Both receive and transmit paths have direct memory access ("DMA") via modules 129 and 135. Transmit path also has a scheduler 134 that is coupled to processor 112 and schedules transmit operations.

Adapter 106 includes request queue DMA channel 0 130, response queue DMA channel 131, request queue (1) DMA channel 132 that interface with request queue 103 and response queue 104; and a command DMA channel 133 for managing command information.

Figure 1C:
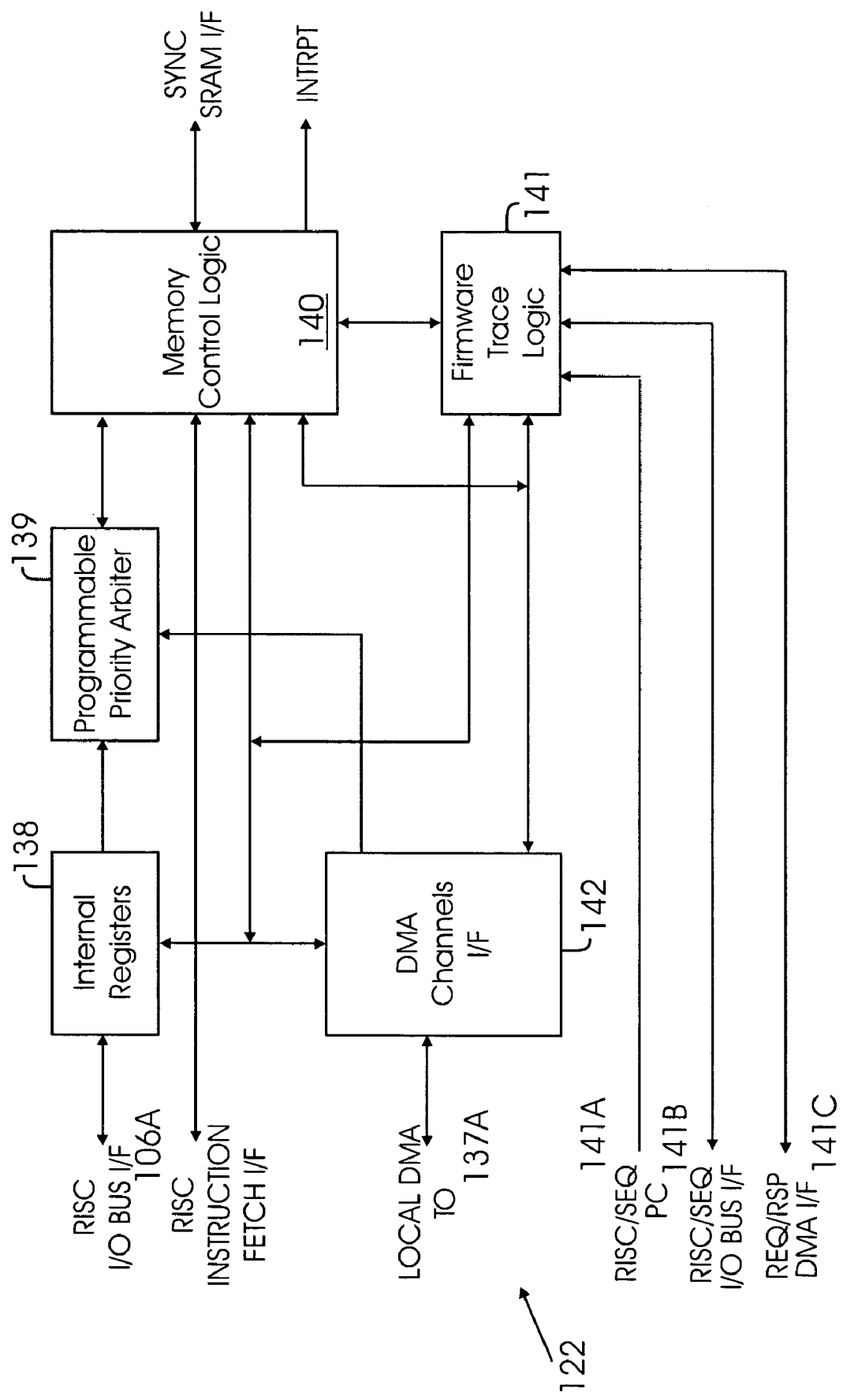
FIG. 1C shows a block diagram of a local memory interface, according to one aspect of the present invention.

FIG. 1C shows a block diagram of memory interface 122 that arbitrates between requests to access local memory from various DMA channels via DMA interface 142 that interfaces with local DMA module 137A. Registers 138 store configuration information that is received from processor 106A.

Arbiter 139 is provided to manage access to local memory that is shared by plural DMA channels. Priorities may be pre-programmed using processor 106A.

Control logic 140 interfaces with all the modules of interface 122 and loads firmware trace, according to one aspect of the present invention.

Firmware trace module 141 provides a mechanism to transfer trace information regarding processor 106A, 109, 112, and modules 130, 131 and 132 to an external memory (for example, 108 and 110). Trace information can be used for later analysis. Logic 141 receives processor 106A program counter data 141A and bi-directional data 141B and 141C. Trace module 141 can use the request/response DMA channel (130-131) to move trace information to memory 108/110.

Figure 1D:
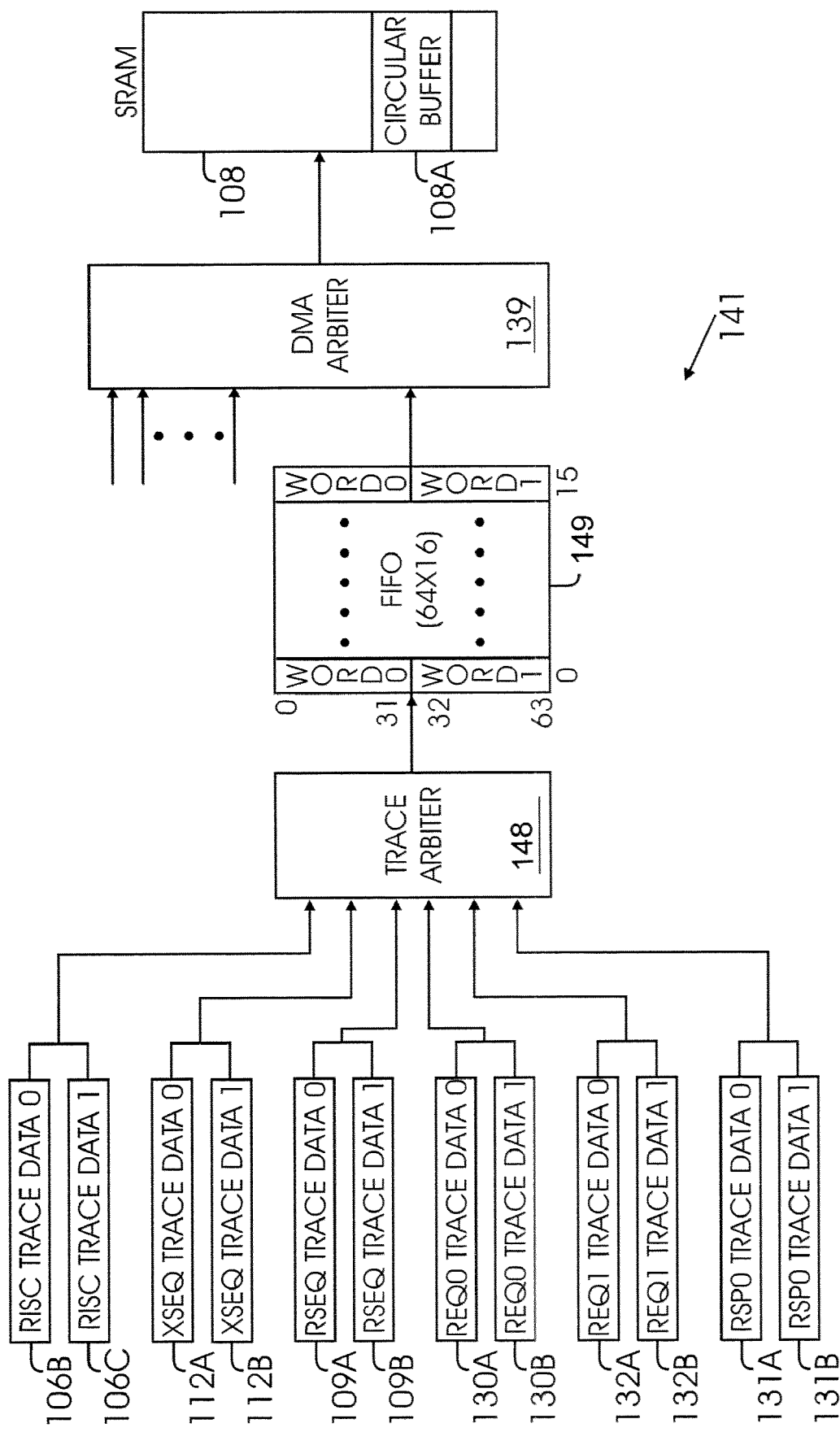
FIG. 1D shows a block diagram of trace logic, according to one aspect of the present invention.

FIG. 1D provides a detailed block diagram of trace logic 141. Module 141 includes a trace arbiter module 148 that receives trace information from various sources. In one aspect, each source is provided two trace registers that may be written by adapter 106 firmware or local DMA module 137A.

As shown in FIG. 1D, trace data, 106B and 106C from processor 106A, 112A and 112B from processor 112, 109A and 109B from processor 109, 130A and 130B from request queue module 130, 132A and 132B from request module (1) 132, and 131A and 131D from response queue module 131, respectively, enter arbiter 148. Trace information is then moved into temporary memory 149, which may be a first in first out (FIFO) module that is used to hold data before it is moved into local memory 108 or 109 through arbiter 139 that is controlled by logic 140.

In one aspect, a circular buffer 108A is used to store trace data, which is maintained by the firmware of adapter 106. Firmware defines the location and size of buffer 108A by setting up a Starting and Ending Address registers. A segment size may be set and every time a segment size data block is stored, the segment count is incremented and an interrupt generated to processor 106A.

It is noteworthy that module 141 can be programmed for 1-word or 2-word transfers. If a 1-word transfer is selected, the trace information results in an IOCB address from processor 106A memory pointer. If a 2-word transfer is selected, the data results in an out-pointer (for example, 21 bits and an IOCB address) from processor memory 106A.

Figures 1E, 1F:
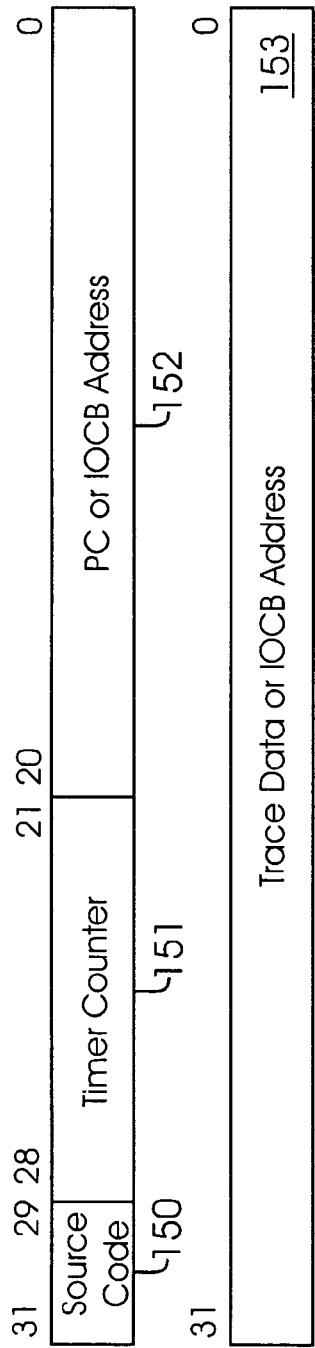
FIG. 1E shows a block diagram of trace data format that is stored in external memory, according to one aspect of the present invention.
FIG. 1F shows a table with an example of code associated with the source of trace data, collected according tone aspect of the present invention.

FIG. 1E shows a block diagram of trace data format that is stored in external memory. Trace data includes a code 150 that denotes the source of the data, as shown in the table of FIG. 1F. For example, code "000" denotes that the trace data is from RISC 106A, "001" denotes that trace data is from processor 112 and so forth.

A timer counter value 151 provides a time stamp for the data, i.e., when the data was actually recorded. Program counter or IOCB address 152 denotes the actual address of the IOCB or the program counter. Trace data 153 includes the actual data or an IOCB address.

FIGS. 2-15 show registers 138 that are used in various adaptive aspects of the present invention. FIG. 2 shows a listing of various registers that are used and described herein. FIG. 3 shows a table with control register values that enable and/or disables trace data collection, according to one aspect of the present invention. Various bit values, for example, "bit 8" if set enables trace information collection from processor 106A.

FIG. 4 shows a circular buffer 108A start address register, which holds the start address in buffer 108A. FIG. 5 holds the end address in buffer 108A.

FIG. 6 holds the memory address of buffer 108A where data is written, while FIG. 7 provides the size of RAM buffer segments. FIG. 8 shows the register that is used to hold the number of segments that are being stored in buffer 108A at any given time.

F*igure* 9 shows a register that is used to hold the number of clocks before incrementing the second stage 9-bit counter. FIG. 10 shows a register that is written with "dummy" data when a 1-word trace is performed on processor 106A. FIG. 11 shows a register that holds trace data from processor 106A, while performing a 2-word trace.

FIG. 12 shows a register that contains dummy data when performing a 1-word trace involving processor 112. FIG. 13 shows trace data involving processor 112 and is written when a 2-word trace is performed.

FIG. 14 shows a register that contains dummy data when performing a 1-word trace involving processor 109. FIG. 15 shows trace data involving processor 109 and is written when a 2-word trace is performed.

Firmware running on processor 106A converts data in local memory. Firmware can parse data stored in buffer 108A by using a graphical user interface ("GUI"). The GUI allows a user to filter the data and easily interpret the interpret the data since it is correlated with program counters and is time stamped.

Although the present invention has been described with reference to specific embodiments, these embodiments are illustrative only and not limiting. Many other applications and embodiments of the present invention will be apparent in light of this disclosure and the following claims.

What is claimed is:

1. A system for storing trace information for an adapter coupled to a host computing system, comprising:
    a plurality of processing modules in the adapter, each processing module provides a trace information indicative of an operation performed by the processing module;
    a programmable trace logic that includes a plurality of trace registers and a temporary memory, and the programmable trace logic configured to selectively enable and disable collection of trace information from the plurality of processing modules by a firmware executed by the adapter;
    wherein each of the processing modules is assigned a dedicated trace register from among the plurality of trace registers in the programmable trace logic; and when the collection of trace information from the plurality of processing modules is selectively enabled for collection by the adapter, the trace information provided by each of the plurality of processing module selectively enabled for collection is temporarily stored in the temporary memory of the programmable trace logic; and
    wherein the temporarily stored trace information provided by each of the processing module selectively enabled for collection, a code indicative of the processing module and a time stamp indicative of when the trace information was collected is transferred from the temporary memory to a memory external to the adapter.

2. The system of claim 1, wherein the adapter is a host bus adapter (HBA) and includes a receive path processor as one of the processing modules for processing information received from a storage area network and trace data regarding the receive path processor is first temporarily stored in the temporary memory before being transferred to the external memory.

3. The system of claim 2, wherein the HBA includes a transmit path processor as another processing module to process information received from the host computing system and trace data regarding the transmit path processor is first temporarily stored in the temporary memory before being transferred to the external memory.

4. The system of claim 1, further includes a control register to indicate processing modules that are selectively enabled for collection of trace information.

5. The system of claim 1, wherein the trace logic includes an arbitration module that receives trace data from the plurality of trace registers.

6. The system of claim 1, wherein the trace data is stored in a first in first out (FIFO) based buffer before being sent to a direct memory access arbiter module and then to the external memory.

7. The system of claim 6, wherein trace data as stored in the external memory includes a trace data source identity value, and a time stamp value indicating when trace data was collected.

8. The system of claim 4, wherein trace data from each of the plurality of trace registers is first stored in a first in first out (FIFO) memory location, before being transferred to the memory external to the adapter.

9. The system of claim 8, wherein an arbitration module is used to select one of the trace register from among the plurality of trace registers to transfer data from the selected trace register to the FIFO memory location.

10. A host bus adapter ("HBA") coupled to a host computing system, the HBA having a plurality of processing modules for transferring information to and from the host computing system, comprising:
    each processing module configured to provide a trace information indicative of the operation performed by the processing module;
    a local memory interface that includes a programmable trace logic that is configured to selectively enable and disable collection of trace information from the plurality of processing modules by a firmware executed by the HBA;
    wherein the programmable trace logic includes a plurality of trace registers and a temporary memory; and each of the processing module is assigned a dedicated trace register from among the plurality of trace registers; and when, the collection of trace information from the plurality of processing modules is selectively enabled by the adapter, the trace information provided by each of the plurality of processing module selectively enabled for collection is temporarily stored in the temporary memory of the programmable trace logic; and
    wherein the temporarily stored trace information provided by each of the processing module selectively enabled for collection, a code indicative of the processing module and a time stamp indicative of when the trace information was collected is transferred to a memory external to the adapter.

11. The HBA of claim 10, includes a receive path processor as one of the processing modules for processing information received from a storage area network and trace data regarding the receive path processor is first temporarily stored in the temporary memory before being transferred to the external memory.

12. The HBA of claim 11, wherein includes a transmit path processor as another processing module to processes information received from the host computing system and trace data regarding the transmit path processor is first temporarily stored in a the temporary memory before being transferred to the external memory.

13. The HBA of claim 10, further includes a control register to indicate processing modules that are selectively enabled for collection of trace information.

14. The HBA of claim 10, wherein the trace logic includes an arbitration module that receives trace data from the plurality of trace registers.

15. The HBA of claim 10, wherein the trace data is stored in a first in first out (FIFO) based buffer before being sent to a direct memory access arbiter module and then to the external memory.

16. The HBA of claim 15, wherein the trace data as stored in the external memory includes a trace data source identity value, and a time stamp value indicating when trace data was collected.

17. The HBA of claim 13, wherein trace data from each of the plurality of trace registers is first stored in a first in first out (FIFO) memory location, before being transferred to the memory external to the adapter.

18. The HBA of claim 17, wherein an arbitration module is used to select a trace register from among the plurality of trace registers to transfer data from the selected trace register to the FIFO memory location.

19. A local memory interface for storing processor trace information for an adapter coupled to a host computing system, the adapter using a plurality of processing modules transferring information to and from the host computing system, comprising:

a programmable trace logic that includes a plurality of trace registers and a temporary memory;

wherein the programmable trace logic is configured to receive from each processing module a trace information indicative of the operation performed by the processing module;

wherein the programmable trace logic is configured to selectively enable and disable collection of trace information from the plurality of processing modules by a firmware executed by the adapter;

wherein each of the processing modules is assigned a dedicated trace register from among the plurality of trace registers; and when the collection of trace information from the plurality of processing modules is selectively enabled by the adapter, the trace information received from each of the plurality of processing module selectively enabled for collection is temporarily stored in the temporary memory; and wherein the temporarily stored trace information received from each of the processing module, a code indicative of the processing module and a time stamp indicative of when the trace information was collected is transferred from the temporary memory to a memory external to the adapter.

20. The interface of claim 19, wherein the trace logic includes an arbitration module that receives trace data from the plurality of trace registers.

21. The interface of claim 20, wherein the trace data is stored in a first in first out (FIFO) based buffer before being sent to a direct memory access arbitration module and then to the external memory.

22. The interface of claim 19, wherein trace data as stored in the external memory includes a trace data source identity value, and a time stamp value indicating when trace data was collected.

* * * * *

UNITED STATES PATENT AND TRADEMARK OFFICE
CERTIFICATE OF CORRECTION

PATENT NO. : 7,669,190 B2  Page 1 of 1
APPLICATION NO. : 10/847756
DATED : February 23, 2010
INVENTOR(S) : Dharma R. Konda et al.

It is certified that error appears in the above-identified patent and that said Letters Patent is hereby corrected as shown below:

On page 3, in column 2, under "Other Publications", line 16, delete "Pacer" and insert -- Paper --, therefor.

In column 5, line 17, delete "Figure" and insert -- FIG. --, therefor.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,669,190 B2 | Page 1 of 1 |
| APPLICATION NO. | : 10/847756 | |
| DATED | : February 23, 2010 | |
| INVENTOR(S) | : Dharma R. Konda et al. | |

It is certified that error appears in the above-identified patent and that said Letters Patent is hereby corrected as shown below:

Title page 3, in column 2, under "Other Publications", line 16, delete "Pacer" and insert -- Paper --, therefor.

In column 5, line 17, delete "Figure" and insert -- FIG. --, therefor.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,669,190 B2 Page 1 of 1
APPLICATION NO. : 10/847756
DATED : February 23, 2010
INVENTOR(S) : Konda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1293 days.

Signed and Sealed this

Seventh Day of December, 2010

David J. Kappos
*Director of the United States Patent and Trademark Office*